US012308569B2

(12) United States Patent
Takashima et al.

(10) Patent No.: US 12,308,569 B2
(45) Date of Patent: May 20, 2025

(54) LEVER TYPE ELECTRICAL CONNECTOR WITH INNER AND OUTER HOUSINGS

(71) Applicant: Yazaki Corporation, Tokyo (JP)

(72) Inventors: Naoto Takashima, Makinohara (JP); Koutaro Tobino, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 245 days.

(21) Appl. No.: 18/299,141

(22) Filed: Apr. 12, 2023

(65) Prior Publication Data

US 2023/0369804 A1 Nov. 16, 2023

(30) Foreign Application Priority Data

May 12, 2022 (JP) ................................ 2022-078597

(51) Int. Cl.
*H01R 13/629* (2006.01)

(52) U.S. Cl.
CPC .............................. *H01R 13/62938* (2013.01)

(58) Field of Classification Search
CPC ........ H01R 13/62938; H01R 13/62955; H01R 13/62933
See application file for complete search history.

(56) References Cited

U.S. PATENT DOCUMENTS

| | | | | |
|---|---|---|---|---|
| 5,230,635 A * | 7/1993 | Takenouchi | ..... H01R 13/62938 | 439/153 |
| 6,733,313 B2 * | 5/2004 | Shinozaki | ........ H01R 13/62938 | 439/372 |
| 6,764,324 B2 * | 7/2004 | Shinozaki | ........ H01R 13/62933 | 439/372 |
| 6,827,593 B2 * | 12/2004 | Shinozaki | ........ H01R 13/62955 | 439/157 |
| 6,942,504 B2 * | 9/2005 | Shinozaki | ........ H01R 13/62955 | 439/157 |
| 9,496,646 B2 * | 11/2016 | Kawashima | ........... H01R 13/64 | |
| 2003/0162426 A1 | 8/2003 | Shinozaki et al. | | |
| 2003/0162427 A1 | 8/2003 | Shinozaki et al. | | |
| 2003/0166351 A1 | 9/2003 | Shinozaki et al. | | |
| 2023/0307871 A1 | 9/2023 | Okuyama | | |

* cited by examiner

*Primary Examiner* — Vanessa Girardi
(74) *Attorney, Agent, or Firm* — Sughrue Mion, PLLC

(57) ABSTRACT

A connector housing includes: a housing body configured to accommodate a connector terminal; and a lever axially supported on the housing body so as to be rotatable around a rotation axis, the lever being configured to rotate around the rotation axis from a temporary lock position to a final lock position to finally lock a mating connector to the housing body by pulling the mating connector having been temporarily locked. The lever includes an operation portion and an arm portion having a shaft-receiving hole. The housing body includes an inner housing formed in a tubular shape that includes a terminal accommodation chamber and having a shaft projection and an outer housing attached to the inner housing such that the arm portion is sandwiched between the outer housing and at least a surface portion of the outer peripheral surface of the inner housing from which the shaft projection projects.

9 Claims, 9 Drawing Sheets

LEVER TYPE ELECTRICAL CONNECTOR WITH INNER AND OUTER HOUSINGS

TECHNICAL FIELD

The present invention relates to a connector housing, a connector in which connector terminals are accommodated in a connector housing, and a wire harness having a connector at an end portion.

BACKGROUND

Japanese Patent Application Publication No. 2003-249303, Japanese Patent Application Publication No. 2003-249304, and Japanese Patent Application Publication No. 2003-249305 disclose conventional connector housings including a lever for assisting connection of connectors. In a connector in which connector terminals are accommodated in such a connector housing, first, a mating connector is temporarily locked to a housing body to which a lever is attached. Thereafter, the lever is rotated to pull the mating connector to make a final locking, so that connection of the connectors is completed. Furthermore, in the above connector housing, an arm portion provided with a shaft-receiving hole is accommodated in an accommodation recess, in a narrow groove-shape, of the housing body, and in the housing body, a shaft projection is fitted into and axially supported by the shaft-receiving hole. The walls of the accommodation recess that sandwich the arm portion from above and below achieve the function of, e.g., preventing the lever from detaching from the housing body.

SUMMARY OF THE INVENTION

Problem to be Solved by the Invention

In this case, when the connector housing is assembled, a lever attachment operation is performed to fit the shaft projection into the shaft-receiving hole while the arm portion is accommodated in the accommodation recess. In this lever attachment operation, the walls of the accommodation recess, which achieve the function of preventing the lever from detaching by sandwiching the arm portion after the attachment, become obstacles to the operation of attaching the lever. For this reason, in the lever attachment operation, it is necessary to, e.g., temporarily widen the groove width by bending the walls of the accommodation recess, i.e., the obstacles. Such an operation not only imposes a burden on the worker, but also may deteriorate the walls of the accommodation recess due to forcible bending and reduce the holding strength of the lever.

Therefore, in view of the above problems, it is an object of the present invention to provide a connector housing, a connector, and a wire harness that reduce the workload related to attachment of the lever and improve the holding strength of the lever.

Solution to Problem

In order to solve the above problems, a connector housing includes a housing body configured to accommodate a connector terminal; and a lever axially supported on the housing body so as to be rotatable around a rotation axis, the lever being configured to rotate around the rotation axis from a temporary lock position to a final lock position to finally lock a mating connector to the housing body by pulling the mating connector having been temporarily locked, wherein the lever includes: an operation portion with which a rotation operation is performed; and an arm portion extending from the operation portion to cross the rotation axis and having a shaft-receiving hole formed at a position that crosses the rotation axis, wherein the housing body includes: an inner housing formed in a tubular shape that includes a terminal accommodation chamber configured to accommodate the connector terminal, a shaft projection configured to be fitted into the shaft-receiving hole of the arm portion projecting from an outer peripheral surface of the inner housing to cross an axis of the tubular shape and form the rotation axis, and an outer housing attached to the inner housing such that the arm portion having the shaft projection being fitted into the shaft-receiving hole is sandwiched between the outer housing and at least a surface portion of the outer peripheral surface from which the shaft projection projects so that the arm portion is rotatable around the rotation axis.

Furthermore, in order to solve the above problems, a connector includes a connector terminal; and the above-described connector housing configured to accommodate the connector terminal.

Furthermore, in order to solve the above problems, a wire harness includes a terminal-attached electric wire having a connector terminal connected to an end portion of an electric wire; and the above-described connector housing configured to accommodate the connector terminal of the terminal-attached electric wire.

Advantageous Effect of the Invention

According to the connector housing, the connector, and the wire harness explained above, the workload related to attachment of the lever can be reduced, and the holding strength of the lever can be improved.

BRIEF DESCRIPTION OF THE DRAWINGS

FIGS. 1A and 1B are perspective views illustrating one embodiment of a wire harness in which FIG. 1A shows the temporary locked position and FIG. 1B shows the final locked position.

DETAILED DESCRIPTION OF THE EXEMPLARY EMBODIMENT

Hereinafter, an embodiment of a connector housing, a connector, and a wire harness is described.

Figures 1A, 1B:
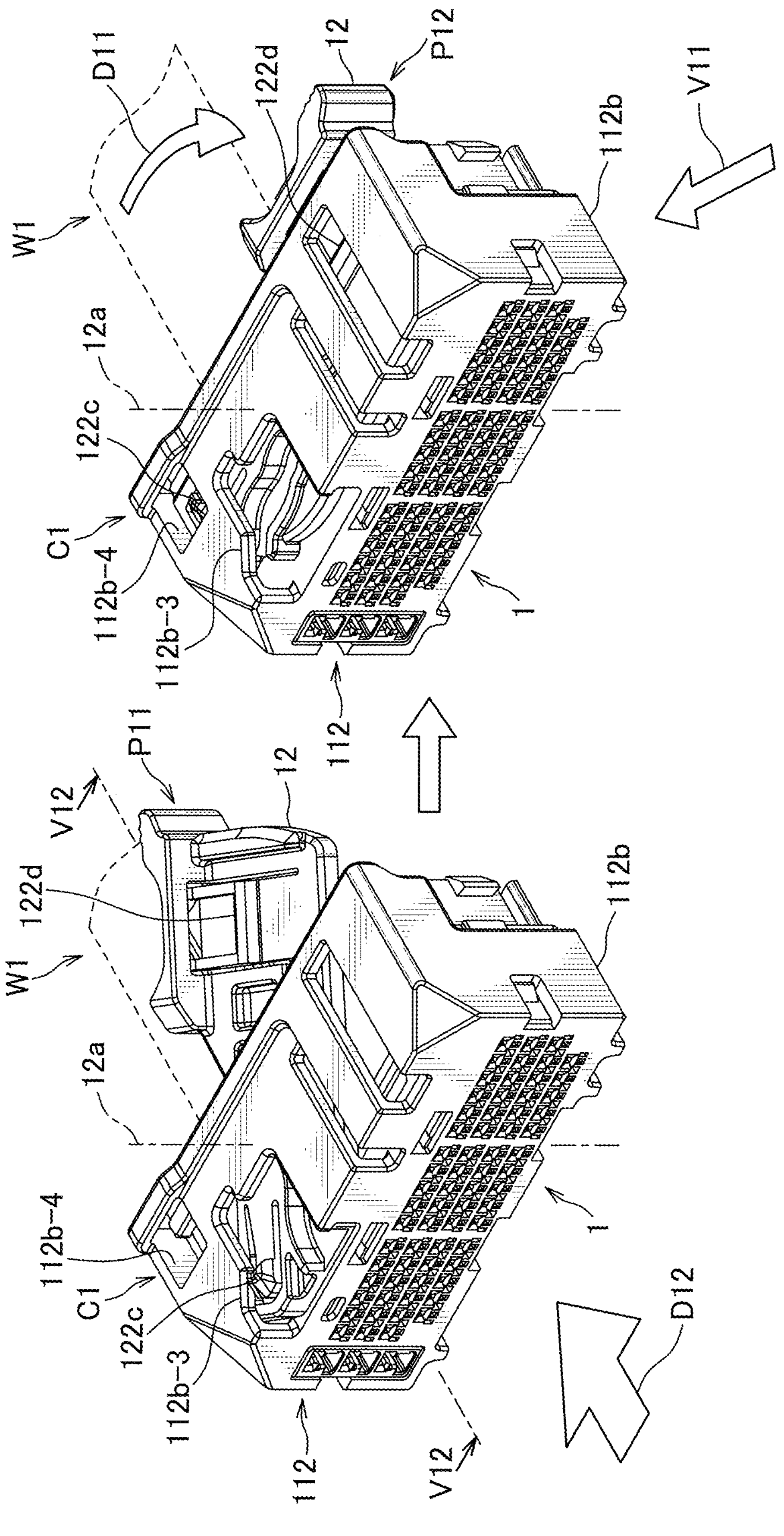

FIGS. 1A and 1B are perspective view illustrating an embodiment of a wire harness W1.

The wire harness W1 according to the present embodiment is provided with a connector C1 at an end portion. The connector C1 includes a lever 12 for assisting connection with a mating connector. This lever 12 is operated by a worker, and the lever 12 accordingly rotates from a temporary lock position P11 to a final lock position P12 in a rotation direction D11 around a predetermined rotation axis 12*a*, thereby assisting the connection between the connector C1 and the mating connector. The temporary lock position P11 is a lever position where the lever 12 is connected to the mating connector when the mating connector is shallowly temporarily locked to the connector C1 in a connector lock direction D12. The final lock position P12 is a lever position where the mating connector, which is temporarily locked and connected to the lever 12, is pulled and finally locked to the connector C1. When the lever 12 rotates to the final lock position P12 and the mating connector is finally locked, the wire harness W1 is electrically connected to the mating wire harness, the mating device, and the like via the connector C1 and the mating connector. Conversely, to disconnect this electrical connection, first, the lever 12 is moved from the final lock position P12 to the temporary lock position P11. This movement releases the final lock between the connector C1 and the mating connector, and returns the connector C1 to the temporary lock state with the mating connector. Thereafter, the worker pulls out the connector C1 from the mating connector. The detailed configuration of the connector C1 in the wire harness W1 and the connector housing 1 that constitutes the connector C1 is described below.

Figure 2:
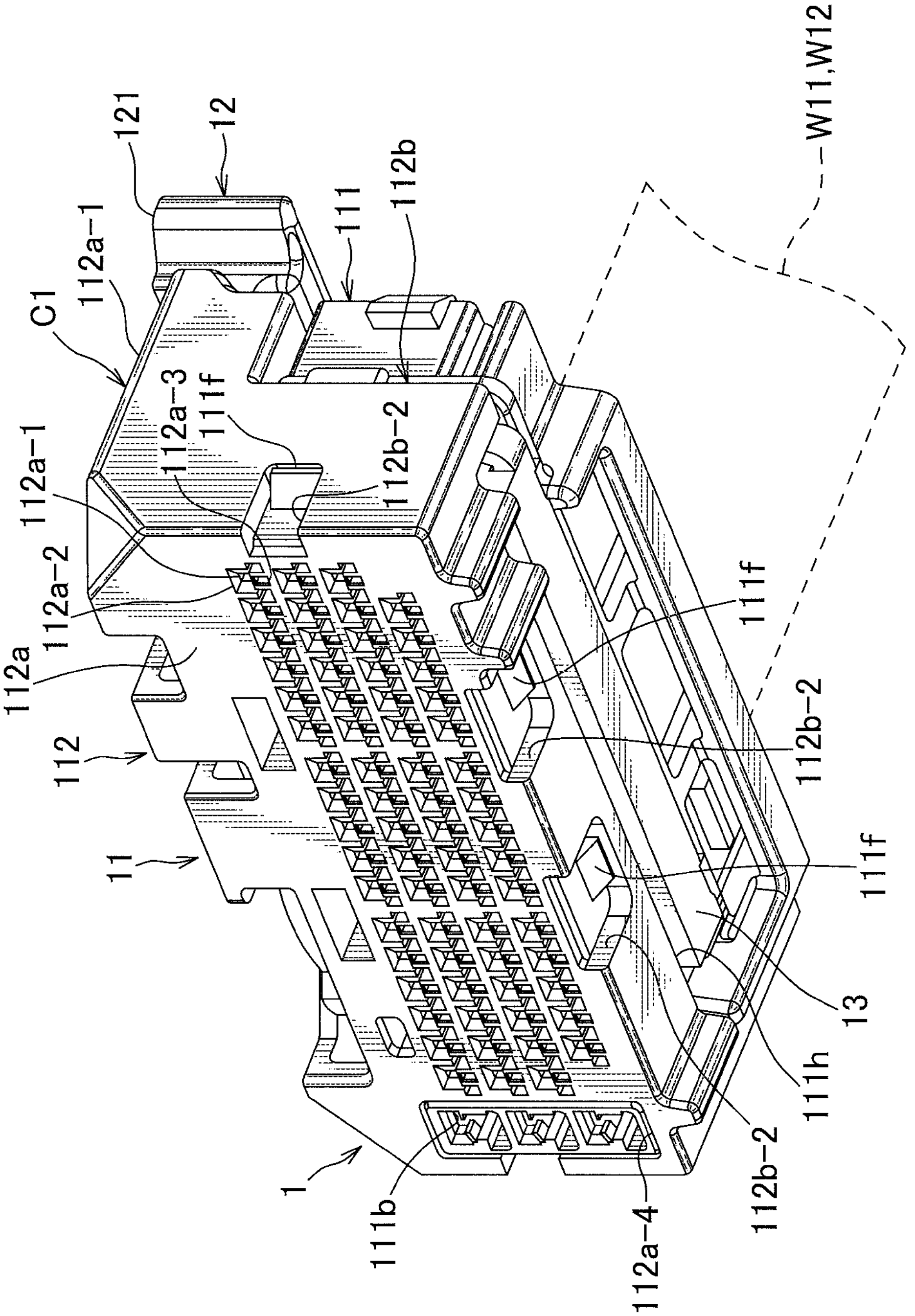
FIG. 2 is a perspective view of a connector and a connector housing illustrated in FIGS. 1A and 1B, as viewed from the direction of arrow V11 in FIG. 1B.
Figures 3A, 3B:
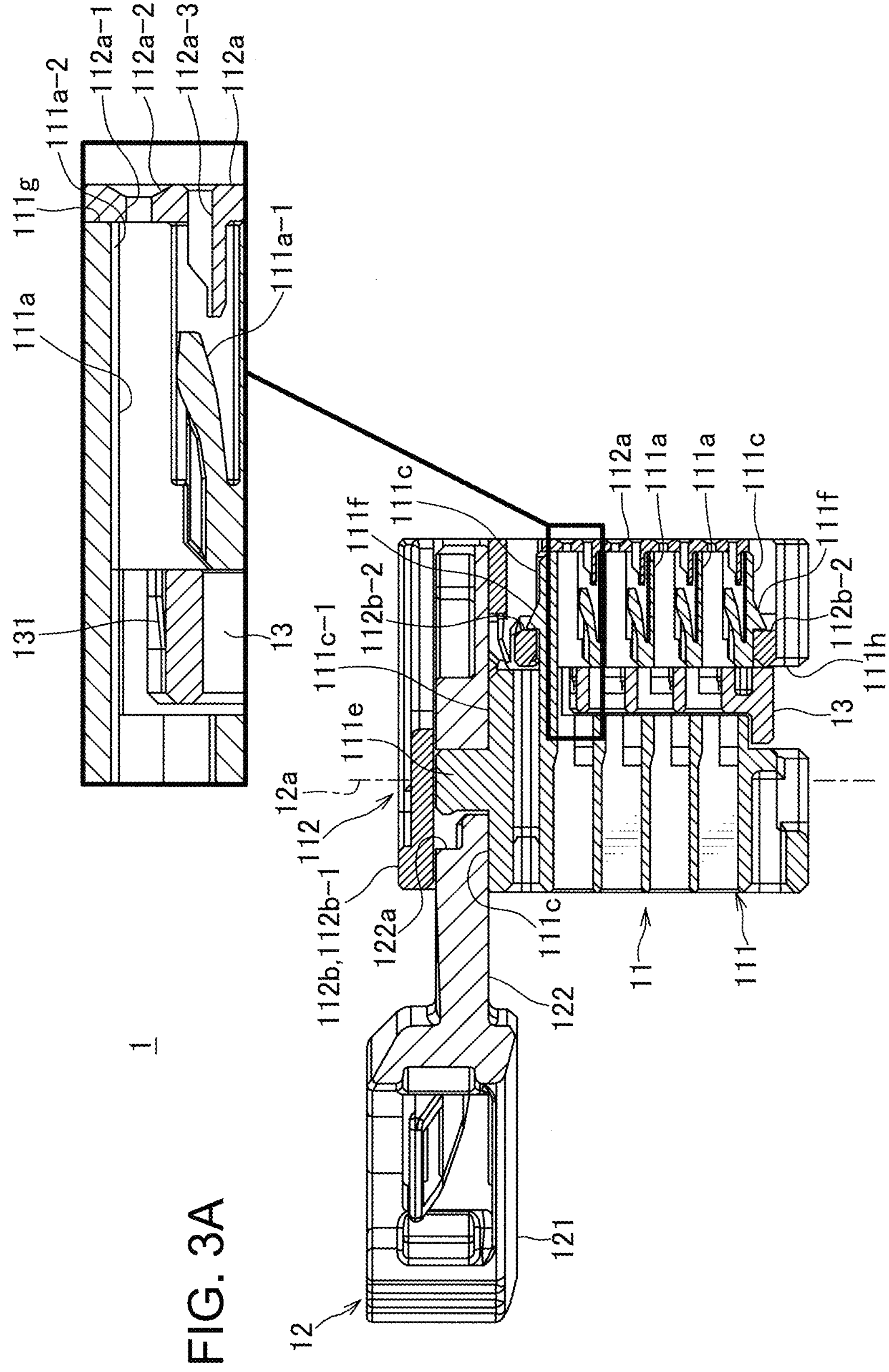
FIG. 3A is a cross-sectional view illustrating, as a cross-section taken along line V12-V12 in FIG. 1A, the connector and the connector housing illustrated in FIGS. 1A and 1B and FIG. 2
FIG. 3B is an exploded view of a portion of FIG. 3A.
Figure 4:
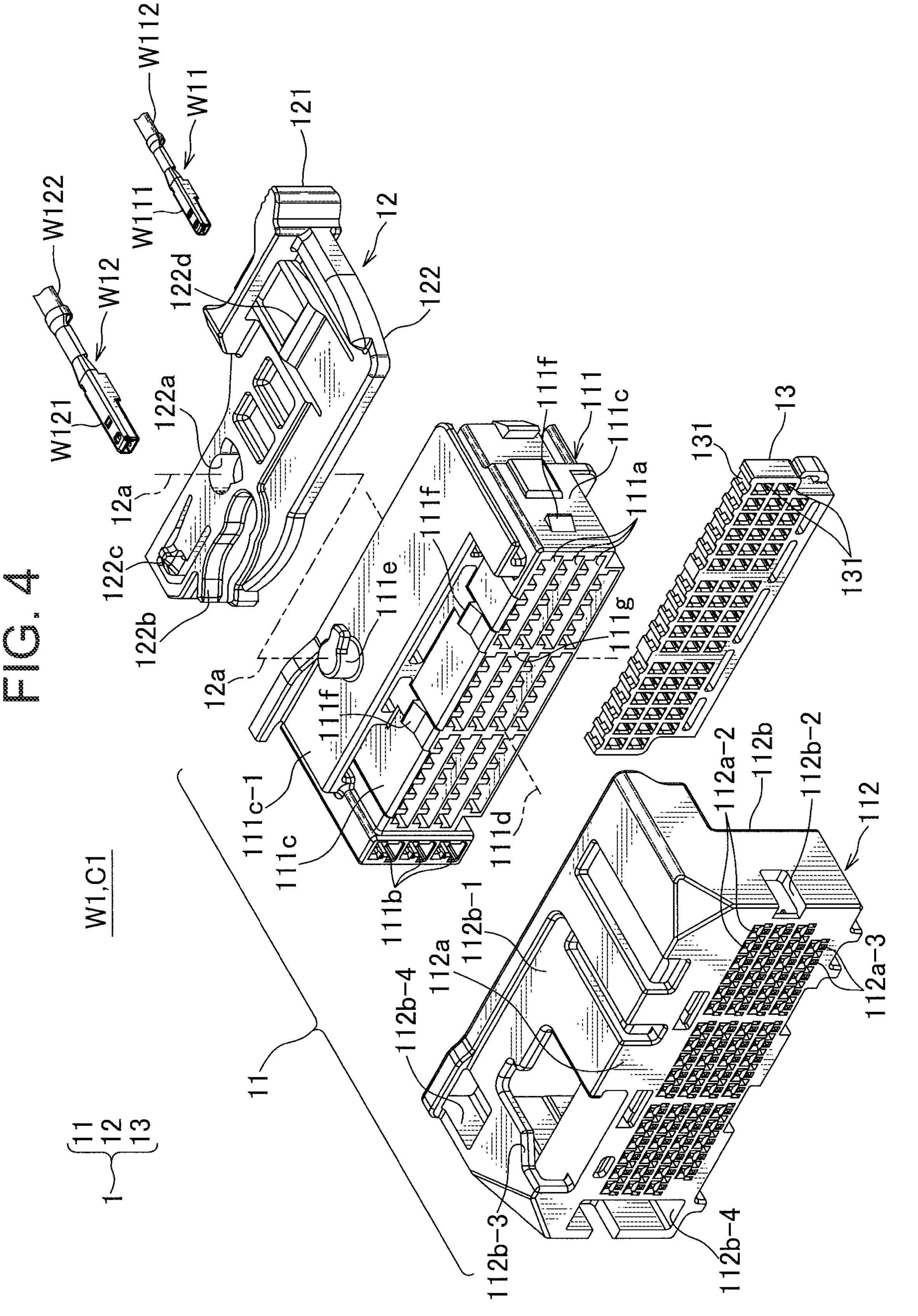
FIG. 4 is an exploded perspective view of the connector and the connector housing illustrated in FIGS. 1 to 3.

FIG. 2 is a perspective view of a connector and a connector housing illustrated in FIG. 1, as viewed from the direction of arrow V11 in FIG. 1. FIG. 3 is a cross-sectional view illustrating, as a cross-section taken along line V12-V12 in FIG. 1, the connector and the connector housing illustrated in FIGS. 1 and 2. FIG. 4 is an exploded perspective view of the connector and the connector housing illustrated in FIGS. 1 to 3.

The connector C1 includes a connector terminal W111 for each of multiple terminal-attached electric wires W11, a large-sized terminal W121 for each of multiple large-sized terminal-attached electric wires W12, and a connector housing 1. The terminal-attached electric wire W11 has the connector terminal W111 connected to an end portion of an electric wire W112. The large-sized terminal-attached electric wire W12 has the large-sized terminal W121, of which the terminal size is larger than that of the connector terminal W111, connected to an end portion of a large electric wire W122 that is larger than the electric wire W112. In the present embodiment, both of the connector terminals W111 and the large-sized terminals W121 are female-type terminals. The connector housing 1 is a member that accommodates multiple connector terminals W111 and multiple large-sized terminals W121, and includes a housing body 11, a lever 12, and a spacer 13.

The housing body 11 accommodates the multiple connector terminals W111 and the multiple large-sized terminals W121. The lever 12 is axially supported on the housing body 11 so as to be rotatable around the rotation axis 12*a* and is configured to rotate from the temporary lock position P11 to the final lock position P12 as illustrated in FIG. 1. The lever 12 finally lock the mating connector to the housing body 11 (and also to the connector C1) by pulling the mating connector having been temporarily locked.

The lever 12 includes: an operation portion 121 with which a rotation operation is performed; and an arm portion 122 extending from the operation portion 121 to cross the rotation axis 12*a* and having a shaft-receiving hole 122*a* formed at a position that crosses the rotation axis 12*a*. In the present embodiment, the lever 12 is formed in a single plate shape constituted by the operation portion 121 and the arm portion 122. The arm portion 122 is formed with a cam groove 122*b* configured to receive a portion of the mating connector and to move the portion so as to connect or disconnect the mating connector to or from the housing body 11 according to rotation around the rotation axis 12*a*. When the portion of the mating connector moves inside the cam groove according to rotation of the lever 12 from the temporary lock position P11 to the final lock position P12, the mating connector is pulled toward the housing body 11. Conversely, when the portion of the mating connector moves inside the cam groove according to rotation of the lever 12 from the final lock position P12 to the temporary lock position P11, the mating connector separates from the housing body 11.

The housing body 11 includes an inner housing 111 and an outer housing 112.

The inner housing 111 is a member made of resin formed in a rectangular tubular shape, and includes multiple terminal accommodation chambers 111*a* accommodating connector terminals W111 and multiple large-sized accommodation chambers 111*b* accommodating large-sized terminals W121. The terminal accommodation chambers 111*a* and the large-sized accommodation chambers 111*b* are provided in the inner housing 111 such that an entry side from which the mating terminal of the mating connector enters is open and an accommodation side in which the connector terminal W111 and the large-sized terminal W121 are accommodated is open. Inside the terminal accommodation chamber 111*a*, a lance 111*a*-1 configured to lock with the accommodated connector terminal W111 is provided. Inside the large-sized accommodation chamber 111*b*, a similar lance is also provided.

An outer peripheral surfaces 111*c* crossing the rotation axis 12*a* of outer peripheral surfaces 111*c* on four sides of the rectangular tubular shape of the inner housing 111 is provided with a shaft projection 111*e* in a protruding manner. The shaft projection 111*e* is fitted into the shaft-receiving hole 122*a* of the arm portion 122. The shaft projection 111*e* crosses an axis 111*d* of the inner housing 111 in the tubular shape to form the rotation axis 12*a*. A lock claw 111*f* configured to lock with the outer housing 112 is provided on each of the outer peripheral surfaces 111*c* on the four sides of the inner housing 111.

The outer housing 112 is a cover member made of resin that is attached to the inner housing 111. The arm portion 122 of the lever 12 with the shaft projection 111*e* being fitted into the shaft-receiving hole 122*a* is sandwiched between the outer housing 112 and a surface portion 111*c*-1 of the inner housing 111 from which the shaft projection 111*e* is projecting, such that the arm portion 122 is rotatable around the rotation axis 12*a*. The outer housing 112 includes a mask wall portion 112*a* and an outer tubular portion 112*b*.

The mask wall portion 112*a* is a wall portion that covers a contact surface 111*g* of the inner housing 111, through which the terminal accommodation chambers 111*a* and the large-sized accommodation chambers 111*b* are open and which is configured to contact with the mating connector. As illustrated in the enlarged view of FIG. 3, this mask wall portion 112*a* is provided with through holes 112*a*-1 and guiding-recessed portions 112*a*-2 for the mating terminals at positions corresponding to respective openings 111*a*-2 of the terminal accommodation chambers 111*a*. The through holes 112*a*-1 are through holes that are in communication with the openings 111*a*-2 of the terminal accommodation chambers 111*a*. The guiding-recessed portions 112*a*-2 are shape portions for guiding the mating terminals to the through holes 112*a*-1. The guiding-recessed portions 112*a*-2 are entrances in a rectangular funnel shape, which are formed around the through holes 112*a*-1 and of which bottom sides are connected to the through holes 112*a*-1. Furthermore, the mask wall portion 112*a* is formed with inspection windows 112*a*-3, next to the through holes 112*a*-1, through which the locks of the lances 111*a*-1 in the terminal accommodation chambers 111*a* to the connector terminals W111 are confirmed. The mask wall portion 112*a* is formed with an exposure window 112*a*-4 in a rectangular shape, through which the openings of the multiple large-sized accommodation chambers 111*b* are collectively exposed, at a position corresponding to the multiple large-sized accommodation chambers 111*b*. For the large-sized accommodation chambers 111*b*, the locks of the lances in the inside are confirmed through the opening of each large-sized accommodation chamber 111*b* exposed through the exposure window 112*a*-4.

The outer tubular portion 112*b* is a wall portion in a rectangular tubular shape extending from the outer peripheral edges of the mask wall portion 112*a* so as to cover, from the side of the contact surface 111*g*, the outer peripheral surfaces 111*c* on the four sides of the inner housing 111, including the surface portion 111*c*-1 from which the shaft projection 111*e* projects. Of the outer tubular portion 112*b*, an opposite surface portion 112*b*-1 opposite to the surface portion 111*c*-1 extends longer than the other portions to sandwich the arm portion 122 of the lever 12 between the opposite surface portion 112*b*-1 and the surface portion 111*c*-1. The outer tubular portion 112*b* is formed with lock holes 112*b*-2 for locking with lock claws 111*f* formed on the outer peripheral surfaces 111*c* on the four sides of the inner housing 111.

In this case, the arm portion 122 of the lever 12 is provided with a first lever lock portion 122*c* for holding the lever 12 at the temporary lock position P11 and a second lever lock portion 122*d* for holding the lever 12 at the final lock position P12.

The first lever lock portion 122*c* locks with the outer housing 112 so as to limit rotation to the final lock position P12 when the lever 12 is at the temporary lock position P11. The outer tubular portion 112*b* of the outer housing 112 is provided with a lock-receiving groove 112*b*-3, with which the first lever lock portion 122*c* locks as illustrated in FIGS. 1A and 1B at this occasion. The first lever lock portion 122*c* is a flexibly bendable cantilever with a projection for locking formed at the tip. Locking of the first lever lock portion 122*c* to the lock-receiving groove 112*b*-3 when the lever 12 is at the temporary lock position P11 is made by hooking the projection at the tip to the edge of the lock-receiving groove 112*b*-3. Then, when the mating connector is temporarily locked to the housing body 11, the first lever lock portion 122*c* is bent by the mating connector, which enables the protrusion at the tip to pass under the edge of the lock-receiving groove 112*b*-3, so that the lock is released. In this state, when the lever 12 rotates to the final lock position P12, the first lever lock portion 122*c* moves such that the protrusion at the tip of the first lever lock portion 122*c* passes inside the outer tubular portion 112*b* to reach the window portion 112*b*-4 through which the first lever lock portion 122*c* is exposed and becomes unbent.

Furthermore, the protrusion at the tip of the first lever lock portion 122*c* is formed with a sloped surface that comes into contact with the edge of the window portion 112*b*-4 when the lever 12 rotates from the final lock position P12 to the temporary lock position P11. With this sloped surface, when the first lever lock portion 122*c* rotates to the temporary lock position P11, the first lever lock portion 122*c* bends so that the protrusion passes under the edge of the window portion 112*b*-4, and continues to move inside the outer tubular portion 112*b* to reach the lock-receiving groove 112*b*-3, where the first lever lock portion 122*c* is exposed and becomes unbent. Of the projection at the tip of the first lever lock portion 122*c*, a portion that comes into contact with the edge of the lock-receiving groove 112*b*-3 when the lever 12 rotates to the final lock position P12 is a standing surface substantially orthogonal to the lever 12. With this standing surface, unless unlocked by the temporary lock of the mating connector, the projection at the tip cannot pass under the edge of the lock-receiving groove 112*b*-3, so that the lock is maintained to hold the lever 12 at the temporary lock position P11.

In contrast, the second lever lock portion 122*d* for holding the lever 12 at the final lock position P12 has the following configuration. When the lever 12 rotates to the final lock position P12, the lever 12 locks with the mating connector with the mating connector finally locking with the housing body 11, so that rotation of the lever 12 to the temporary lock position P11 is restricted. The second lever lock portion 122*d* is a flexibly bendable cantilever with a step for locking formed in the middle. Locking of the second lever lock portion 122*d* to the mating connector when the lever 12 is at the final lock position P12 is made by hooking the step in the middle to a lock-receiving portion provided on the mating connector. This step is formed in a sloped surface on the entry side for the mating connector, and when the mating connector is to be finally locked, this slope bends the second lever lock portion 122*d* until it reaches the lock-receiving portion of the mating connector. In contrast, on the lock side for the lock-receiving portion of the mating connector, this step is formed in a standing surface substantially orthogonal to the lever 12. This standing surface makes it impossible to pass the lock-receiving portion of the mating connector, so that the lock is maintained, and the lever 12 is held at the final lock position P12. Then, when the worker pushes down the tip portion of the cantilever beam to bend the second lever lock portion 122*d*, the step in the middle is unhooked from the lock-receiving portion of the mating connector, so that the lock is released.

Next, the spacer 13 provided in the connector housing 1 is explained. As illustrated in the cross-sectional view of FIG. 3, this spacer 13 is a plate-like member that enters the inside of the inner housing 111 of the housing body 11 by crossing the terminal accommodation chambers 111*a*. The spacer 13 is provided with multiple tightening regulation portions 131, corresponding to the respective terminal accommodation chambers 111*a*, for tightening the connector terminals W111 so as to restrict movement of the connector terminals W111 in the terminal accommodation chambers 111*a*. In the large-sized accommodation chambers 111*b* of the inner housing 111, regulation of movement of the large-sized terminals W121 is sufficiently performed by the locks of large lances in the inside. For this reason, the spacer 13 is formed in such a shape as to cross only the terminal accommodation chambers 111*a* and enter the inside of the inner housing 111 without crossing the large-sized accommodation chambers 111*b*. As illustrated in FIG. 2 and FIG. 3, an entry portion 111*h* for the spacer 13 is open on a side of the inner housing 111 opposite to the shaft projection 111*e*. In other words, the shaft projection 111*e* is provided to protrude from the surface portion 111*c*-1 of the outer peripheral surface 111*c* of the inner housing 111 that is away from the entry portion 111*h* for the spacer 13. The spacer 13 is fitted from the entry portion 111*h* of the inner housing 111 to enter the inside of the inner housing 111.

In this case, entry of the spacer 13 into the inside of the inner housing 111 is performed by two-stage entry as explained below. First, in a first stage before the connector terminals W111 are accommodated in the terminal accommodation chambers 111*a*, the spacer 13 is pushed in and placed at the first position where the connector terminals W111 are allowed to move in the inside of the terminal accommodation chambers 111*a*. In other words, at this first position, the multiple tightening regulation portions 131 of the spacer 13 do not tighten the connector terminals W111, so that the connector terminals W111 are allowed to move. In the first stage, the spacer 13 is in the temporary lock state at this first position. Then, without being restricted in movement by the tightening regulation portions 131, the connector terminals W111 are accommodated in the terminal accommodation chambers 111*a* of the connector housing 1 in which the spacer 13 is temporarily locked at the first position. When all the connector terminals W111 have been accommodated, in a second stage, the spacer 13 is pushed into the inside of the inner housing 111 from the first position and advanced to the second position as follows. That is, at this second position, the tightening regulation portions 131 tightens the connector terminals W111 to regulate movement of the connector terminals W111 in the terminal accommodation chambers 111*a*. At this second position, the spacer 13 is in the final lock state. The spacer 13 is provided to be movable between the first position and the second position, and when, e.g., the connector terminals W111 are to be replaced, the spacer 13 is pulled out from the first position to the second position, so that restriction of movement of the connector terminals W111 is cancelled.

The connector housing 1 as explained above is assembled according to the following procedure. First, the lever 12 is attached to the inner housing 111, and subsequently, the outer housing 112 is attached to the inner housing 111.

Figure 5:
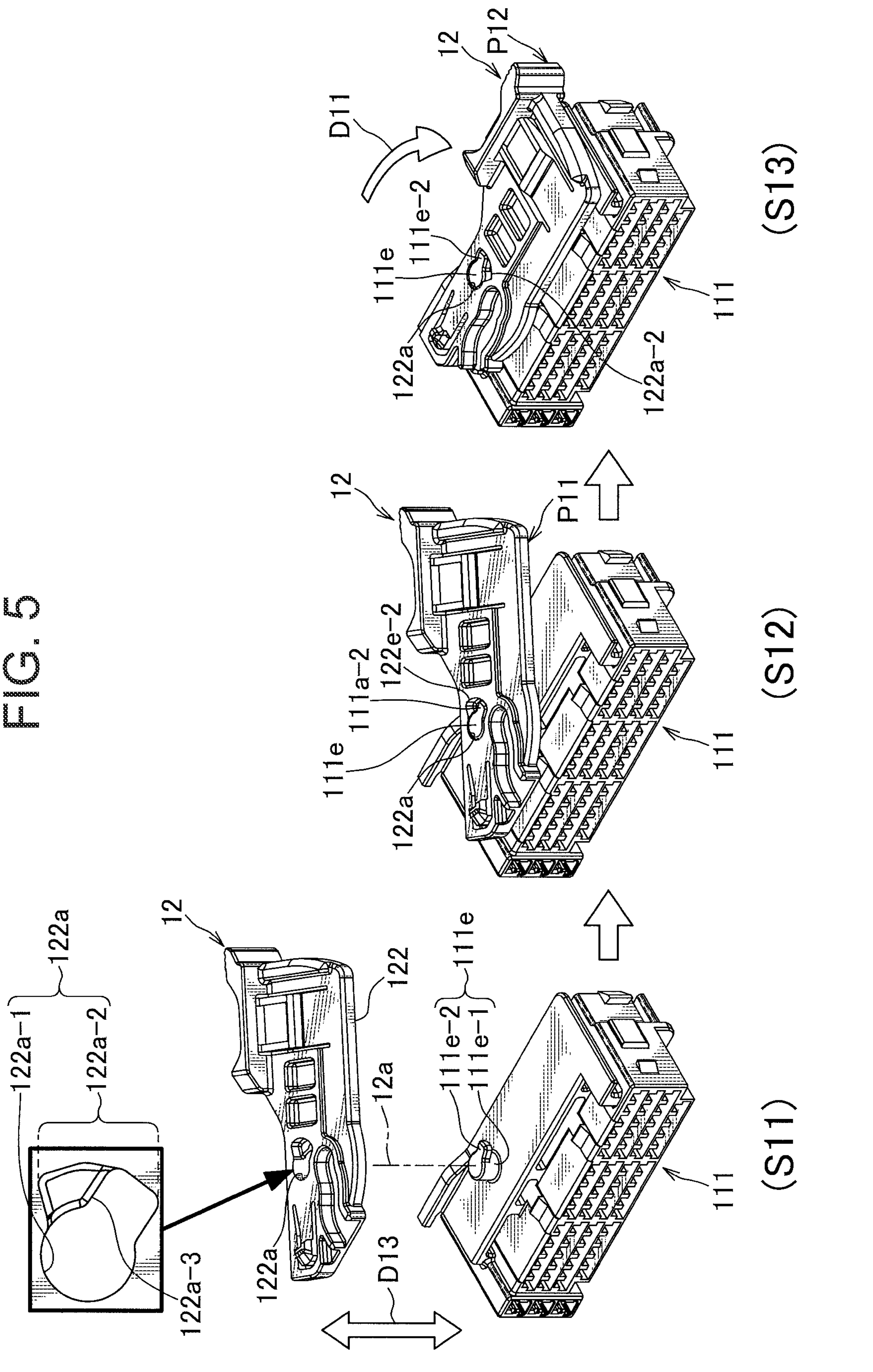
FIG. 5 is a schematic view illustrating, as a perspective view, an operation of attaching the lever illustrated in FIG. 4 to the inner housing.
Figure 6:
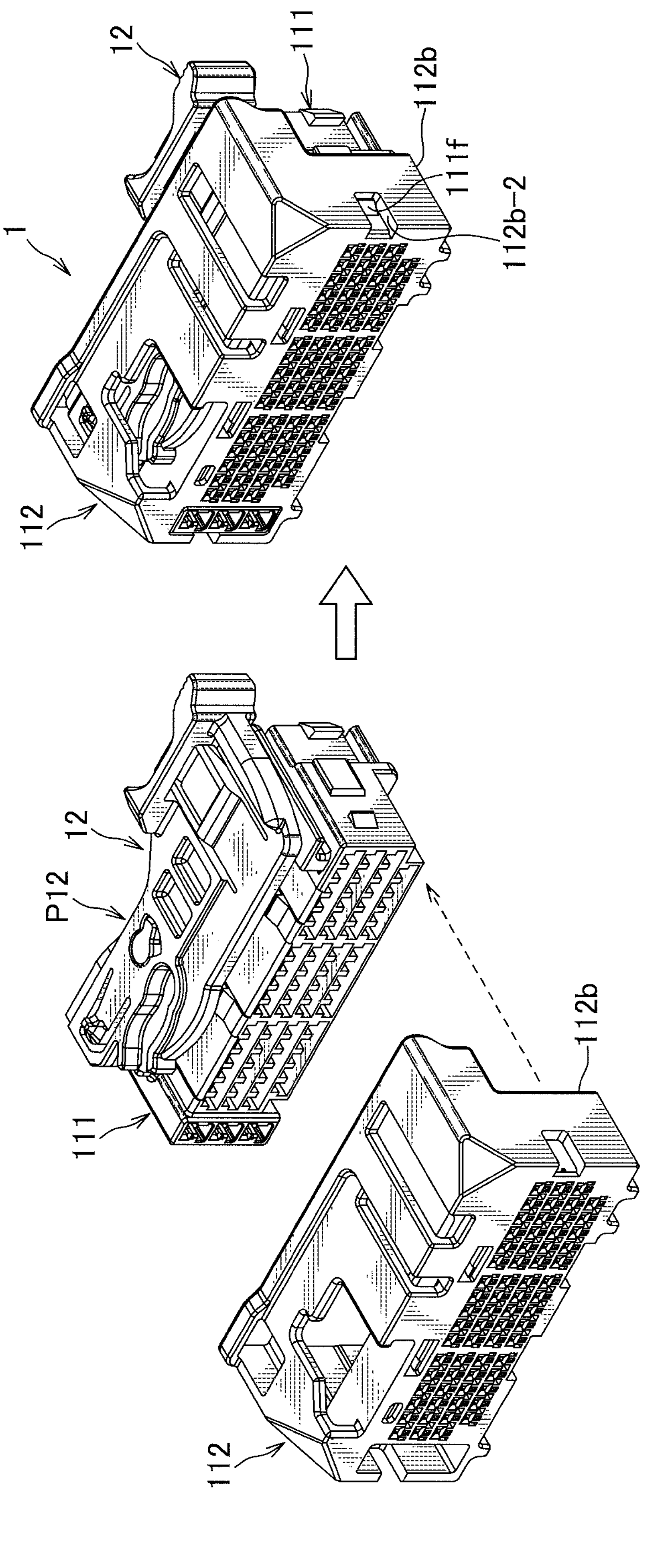
FIG. 6 is a schematic view illustrating, as a perspective view, an operation of attaching the outer housing to the inner housing.
Figure 7:
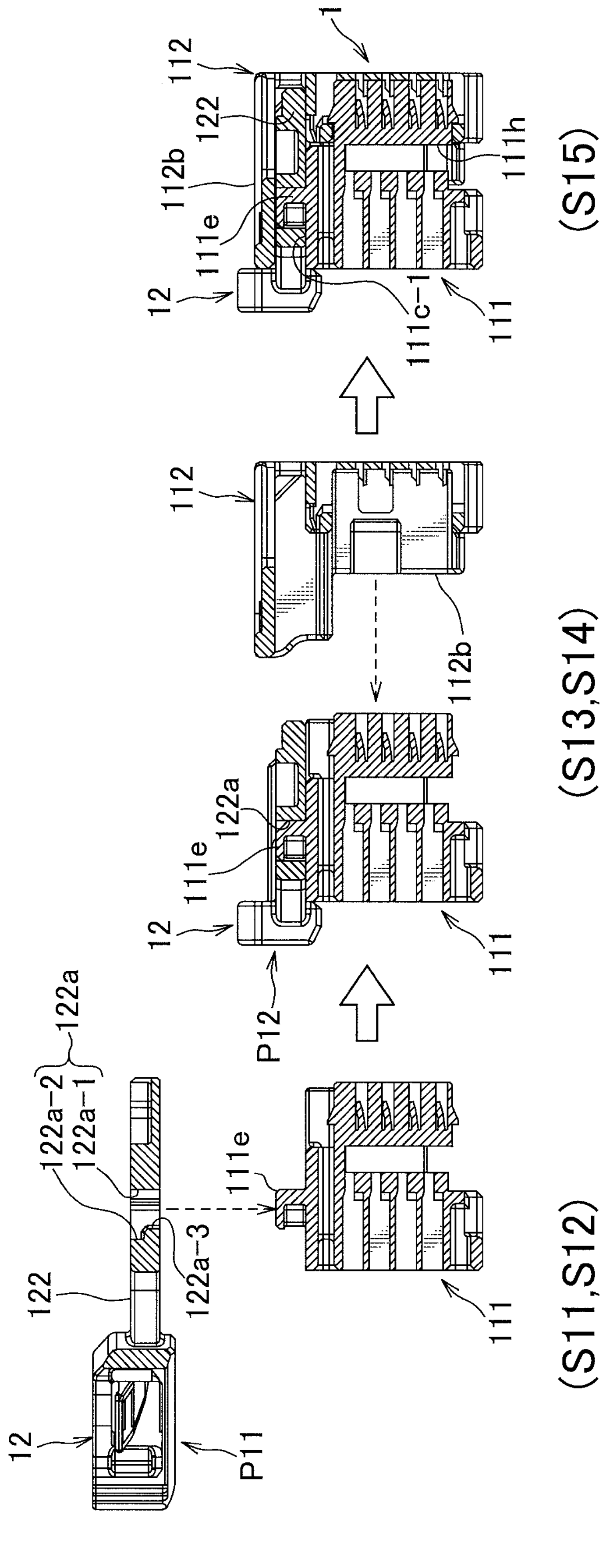
FIG. 7 is a schematic diagram illustrating, as a cross-sectional view taken through the shaft projection, operations from attaching of the lever to attaching of the outer housing.

FIG. 5 is a schematic view illustrating, as a perspective view, an operation of attaching the lever illustrated in FIG. 4 to the inner housing. FIG. 6 is a schematic view illustrating, as a perspective view, an operation of attaching the outer housing to the inner housing. FIG. 7 is a schematic diagram illustrating, as a cross-sectional view taken through the shaft projection, operations from attaching of the lever to attaching of the outer housing.

Attaching of the lever 12 to the inner housing 111 is performed by fitting the shaft projection 111*e* of the inner housing 111 into the shaft-receiving hole 122*a* of the arm portion 122 of the lever 12. At this occasion, in the present embodiment, the shaft projection 111*e* includes a cylindrical portion 111*e*-1 having the rotation axis 12*a* as a central axis and a lateral branch portion 111*e*-2 protruding in a lateral branch manner from the circumferential surface of the cylindrical portion 111*e*-1. In contrast, the shaft-receiving hole 122*a* of the arm portion 122 is formed in a shape in which a circular hole portion 122*a*-1 and a fan hole portion 122*a*-2 are connected. The circular hole portion 122*a*-1 is a circular hole portion through which the cylindrical portion 111*e*-1 penetrates in an axial direction D13 of the rotation axis 12*a*. The fan hole portion 122*a*-2 is a hole portion formed in a fan shape along a trace of a relative movement of the lateral branch portion 111*e*-2 with respect to the arm portion 122 when the lever 12 rotates between the temporary lock position P11 and the final lock position P12 as illustrated in FIGS. 1A and 1B. An interference wall 122*a*-3 is provided in the inside of the fan hole portion 122*a*-2. The interference wall 122*a*-3 interferes with the lateral branch portion 111*e*-2 such that the arm portion 122 does not detach from the inner housing 111 in the axial direction D13 when the lever 12 rotates from the temporary lock position P11.

As illustrated in FIG. 5 and FIG. 7, in the first step S11, the lever 12 is positioned such that the lateral branch portion 111*e*-2 of the shaft projection 111*e* of the inner housing 111 matches with a penetrating portion of the fan hole portion 122*a*-2 that does not overlap with the interference wall 122*a*-3. In the present embodiment, when the lever 12 is at the temporary lock position P11, the lateral branch portion 111*e*-2 matches with the above-described penetrating portion. In the second step S12, the shaft projection 111*e* is fitted into the shaft-receiving hole 122*a* such that the lateral branch portion 111*e*-2 passes through the penetrating portion of the fan hole portion 122*a*-2. In the second step S12, the lever 12 is situated at the temporary lock position P11. Thereafter, in step S13, the lever 12 is moved in a rotation direction D11 from the temporary lock position P11 to the final lock position P12. At the final lock position P12, the lateral branch portion 111*e*-2 of the shaft projection 111*e* interferes with the interference wall 122*a*-3 in the inside of the fan hole portion 122*a*-2, and the lever 12 is attached to the inner housing 111 in such a detachment-preventing state that the shaft projection 111*e* does not detach from the shaft-receiving hole 122*a*.

Next, as illustrated in FIG. 6 and FIG. 7, in the fourth step S14, the outer housing 112 is positioned such that both the lever 12 in the detachment-preventing state at the final lock position P12 and the inner housing 111 are in the inside of the outer tubular portion 112*b*. In the fifth step S15, the outer housing 112 is attached to the inner housing 111. At this occasion, the lock claws 111*f* of the inner housing 111 lock with the lock holes 112*b*-2 of the outer tubular portion 112*b* of the outer housing 112 so that the outer housing 112 locks with the inner housing 111. As a result, the arm portion 122 of the lever 12 is sandwiched between the surface portion 111*c*-1 of the inner housing 111, from which the shaft projection 111*e* projects, and the outer tubular portion 112*b* of the outer housing 112. In this state, even if the lever 12 rotates to the temporary lock position P11, the outer tubular portion 112*b* of the outer housing 112 prevents the lever 12 from detaching. After this fifth step S15, the spacer 13 is inserted from the entry portion 111*h* of the inner housing 111 so that the connector housing 1 is completed.

Next, a comparative example with respect to the embodiment explained with reference to FIGS. 1A and 1B to FIG. 7 is explained.

Figure 8:
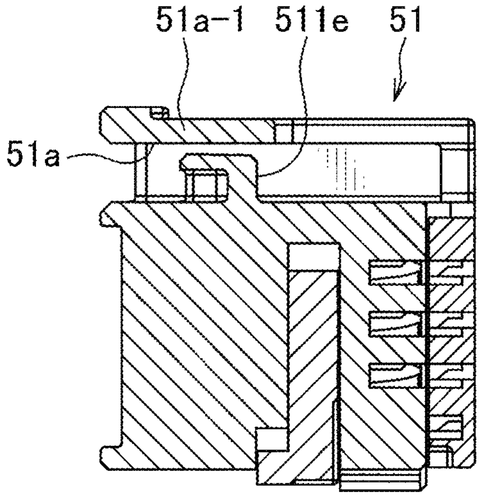
FIG. 8 (PRIOR ART)
FIG. 8 is a cross-sectional view illustrating a housing body in a connector housing according to a comparative example with respect to the embodiment illustrated in FIGS. 1 to 7.
Figure 9:
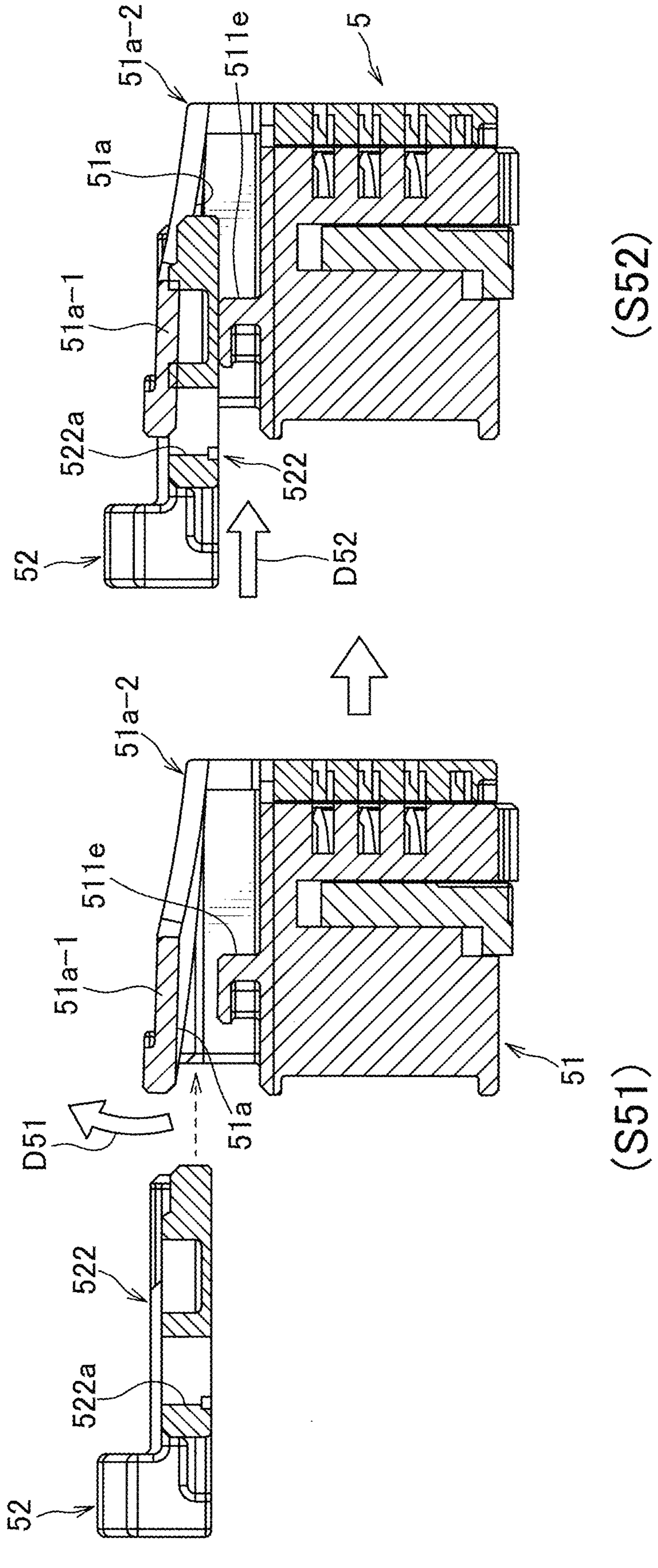
FIG. 9 (PRIOR ART)
FIG. 9 is a drawing schematically illustrating, as a cross-sectional view, attaching of the lever to the connector housing illustrated in FIG. 8.

FIG. 8 is a cross-sectional view illustrating a housing body in a connector housing according to the comparative example with respect to the embodiment illustrated in FIGS. 1A and 1B to 7. FIG. 9 is a drawing schematically illustrating, as a cross-sectional view, attaching of the lever to the connector housing illustrated in FIG. 8.

In a connector housing 5 according to the comparative example, a housing body 51 is not divided into an inner housing and an outer housing, and an accommodation recess 51*a* in a narrow groove shape for accommodating an arm portion 522 of a lever 52 is formed in the housing body 51. In this comparative example, a shaft projection 511*e*, which is fitted into a shaft-receiving hole 522*a* of an arm portion 522, is provided in the inside of the accommodation recess 51*a* of the housing body 51.

In this comparative example, a wall 51*a*-1 of the accommodation recess 51*a* with which the arm portion 522 is sandwiched in the vertical direction becomes an obstacle against insertion of the arm portion 522. Therefore, in a first step S51 of a lever attachment task in this comparative example, the groove width of the accommodation recess 51*a* is temporarily widened due to bending of the wall 51*a*-1 of the accommodation recess 51*a*, i.e., the obstacle, in a bending direction D51. Thereafter, in a second step S52, the arm portion 522 of the lever 52 is inserted in an insertion direction D52 into the accommodation recess 51*a*, of which the groove width is widened, in such a manner as to pass over the shaft projection 511*e*. When the arm portion 522 is sufficiently inserted and the shaft projection 51*l* is fitted into the shaft-receiving hole 522*a*, the wall 51*a*-1 of the accommodation recess 51*a* is unbent.

In this case, in this comparative example, the task of widening the groove width by bending the wall 51*a*-1 of the accommodation recess 51*a* in the first step S51 tends to be a burden on workers. Furthermore, forcible bending may degrade a base portion 51*a*-2 that allows for bending of the wall 51*a*-1 of the accommodation recess 51*a*, and may reduce the holding strength of the lever 52.

In contrast to the comparative example, the connector housing 1, the connector C1, and the wire harness W1 according to the embodiment explained with reference to FIG. 1 to FIG. 7 can achieve the following effects. Specifically, in the present embodiment, the housing body 11 is divided into the inner housing 111 provided with the shaft projection 111*e* for holding the lever and the outer housing 112 attached to the inner housing 111. This divided configuration enables an attachment task of the lever 12, including, first, fitting the shaft projection 111*e* of the inner housing 111 into the shaft-receiving hole 122*a* of the arm portion 122 of the lever 12, and thereafter, attaching the outer housing 112 so as to cover the arm portion 122. In this attachment task, the walls sandwiching the lever 12 to prevent the lever 12 from detaching are formed by attaching the outer housing 112 after the arm portion 122 is attached to the inner housing 111. Therefore, when the shaft projection 111*e* is fitted into the shaft-receiving hole 122*a*, any obstacle such as a surrounding wall does not exist, and the workload of the attachment task of the lever 12 can be alleviated. Furthermore, it is not necessary to forcibly bend the walls provided for prevention of detachment of the lever 12, and degradation of the walls due to attachment task of the lever 12 can be prevented. Therefore, the holding strength of the lever 12 can be improved.

In addition, in the present embodiment, the outer housing 112 includes the mask wall portion 112*a* for covering the contact surface 111*g*, for the mating connector, of the inner housing 111. The mask wall portion 112*a* is provided with the through holes 112*a*-1 for the mating terminals and the guiding-recessed portions 112*a*-2 for the mating terminals. According to this configuration, with the guiding-recessed portions 112*a*-2 of the mask wall portion 112*a*, the outer housing 112 also achieves the function of guiding the mating terminals. Therefore, the size of the connector housing 1 can be reduced as compared with a configuration in which a member having such a guiding function is attached separately.

Furthermore, in the present embodiment, the outer housing 112 includes the mask wall portion 112*a* and the outer tubular portion 112*b*. The lock claws 111*f* are formed on the outer peripheral surface 111*c* of the inner housing 111, and the lock holes 112*b*-2 are formed on the outer tubular portion 112*b* of the outer housing 112. According to this configuration, the outer housing 112 is attached to the inner housing 111 from the side of the contact surface 111*g* for the mating connector. In contrast, a side of the inner housing 111 opposite to the contact surface 111*g* is open, and is therefore can be preferably used as an accommodation side in which the connector terminals W111 are accommodated in the terminal accommodation chambers 111*a*. According to the above configuration, the outer housing 112 can be attached by an easy task, i.e., locking the lock claws 111*f* with the lock holes 112*b*-2.

Furthermore, in the present embodiment, the inner housing 111 is provided with the large-sized accommodation chamber 111*b* for accommodating the large-sized terminals W121 in addition to the terminal accommodation chambers 111*a* such that the large-sized accommodation chambers 111*b* are open through the contact surface 111*g*. The mask wall portion 112*a* is provided with the exposure window 112*a*-4, through which the openings of the large-sized accommodation chambers 111*b* are exposed. According to this configuration, a connector that has multiple types of terminals with different sizes and can transmit multiple types of electrical signals with different voltage and current levels can be made in a preferable manner. The mask wall portion 112*a* is formed such that the openings of the large-sized accommodation chambers 111*b*, which are large and are therefore not required to guide the mating terminals, are exposed through the exposure window 112*a*-4. As a result, the shape of the outer housing 112 can be simplified to reduce the labor required for processing.

Furthermore, in the present embodiment, the lances 111*a*-1 for locking with the connector terminals W111 are provided in the inside of the terminal accommodation chambers 111*a*. Also, in the mask wall portion 112*a*, the inspection windows 112*a*-3, through which the locks of the lances 111*a*-1 are confirmed, are formed next to the through holes 112*a*-1. According to this configuration, the locks of the lances 111*a*-1 with the connector terminals W111 can be confirmed through the inspection windows 112*a*-3 formed in the mask wall portion 112*a*. Therefore, the connector C1 that alleviates, e.g., detachment of the connector terminals W111 from the terminal accommodation chambers 111*a* can be made with a high quality.

Furthermore, in the present embodiment, the lever 12 is formed in a single plate shape constituted by the operation portion 121 and the arm portion 122, and the inner housing 111 is provided with the single shaft projection 111*e*. According to this configuration, only the single lever 12 in the single plate shape is axially supported on the inner housing 111. Therefore, the thickness of the connector housing 1 can be reduced in the axial direction D13 of the rotation axis 12*a* as compared with, for example, a C-shaped lever having two axially supported arm portions 122.

Furthermore, in the present embodiment, the spacer 13 that enters the inside of the inner housing 111 of the housing body 11 by crossing the terminal accommodation chambers 111*a* to restrict movement of the connector terminals W111 is provided. Also, the shaft projection 111*e* is provided to protrude from the surface portion 111*c*-1 of the outer peripheral surface 111*c* of the inner housing 111 that is away from the entry portion 111*h* for the spacer 13. According to this configuration, the lever 12 in the single plate shape can be attached to the inner housing 111 in a preferable manner, without interfering with the spacer 13 for restricting movement of the connector terminals W111 in the inside of the terminal accommodation chambers 111*a*.

Furthermore, in the present embodiment, the shaft projection 111*e* includes the cylindrical portion 111*e*-1 and the lateral branch portion 111*e*-2. The shaft-receiving hole 122*a* of the arm portion 122 is formed in a shape in which the circular hole portion 122*a*-1 and the fan hole portion 122*a*-2 are connected. Also, the interference wall 122*a*-3 is provided in the inside of the fan hole portion 122*a*-2. The interference wall 122*a*-3 interferes with the lateral branch portion 111*e*-2 when the lever 12 rotates from the temporary lock position P11. According to this configuration, movement of the lever 12 can be regulated in a preferable manner between the temporary lock position P11 and the final lock position P12, and the lever 12 can be attached to the inner housing 111 at the temporary lock position P11 in a preferable manner. Also, after the attachment, the position of the ever 12 is moved from the temporary lock position P11 to cause the lateral branch portion 111*e*-2 to interfere with the interference wall 122*a*-3, so that the lever 12 can be prevented from detaching in a preferable manner even before the outer housing 112 is attached.

Furthermore, in the present embodiment, the arm portion 122 is provided with the first lever lock portion 122*c* that locks with the outer housing 112 when the lever 12 is at the temporary lock position P11 and that unlocks by the mating connector. Also, the arm portion 122 is provided with the second lever lock portion 122*d* that locks with the mating connector when the lever 12 to the final lock position P12 and that unlocks when operated. According to this configuration, when, e.g., the connector housing 1 is transported alone as a component, the first lever lock portion 122*c* locks with the outer housing 112, so that the position of the lever 12 can be stabilized at the temporary lock position P11. Also, when, e.g., the connector housing 1 is assembled into the wire harness W1 and connected to the mating connector, the second lever lock portion 122*d* locks with the mating connector, so that the position of the lever 12 can be stabilized at the final lock position P12.

It should be noted that the embodiment described above merely shows a representative form of the connector housing, the connector, and the wire harness. The connector housing, the connector, and the wire harness are not limited thereto, and can be modified and implemented in various ways.

For example, in the above-described embodiment, the connector C1 and the wire harness W1 having the connector housing 1 in the rectangular block shape have been shown as an example of the connector housing, connector, and wire harness. However, the connector housing, the connector, and the wire harness are not limited thereto. For example, the shape of the connector housing may be, for example, a cylindrical block shape or the like, and the shape of the housing may be any shape.

Furthermore, in the above-described embodiment, the connector housing 1, in which the outer housing 112 has the mask wall portion 112*a* that achieves the function of, e.g., guiding the mating terminals, is shown as an example of the connector housing. However, the connector housing is not limited thereto. The outer housing may be in a simple tubular shape that achieves only the detachment prevention function for sandwiching the arm portion of the lever between the inner housing and the outer housing. However, as described above, when the mask wall portion 112*a* that achieves the function of, e.g., guiding the mating terminals is provided in the outer housing 112, the size of the connector housing 1 can be reduced.

Furthermore, in the above-described embodiment, the connector housing 1, in which the outer housing 112 formed with the lock holes 112*b*-2 is attached, from the side of the contact surface 111*g*, to the inner housing 111 formed with the lock claws 111*f*, is shown as an example of the connector housing. However, the connector housing is not limited thereto, and the structure for attaching the outer housing to the inner housing is not particularly limited. However, as described above, according to the above-described structure of attachment using the lock claws 111*f* and the lock holes 112*b*-2, the connector terminals W111 are accommodated in a preferable manner, and the outer housing 112 can be attached by an easy task. Even when a structure for attaching using lock claws and lock holes is provided, the inner housing may be formed with lock holes and the outer housing may be formed with lock claws, conversely to the above-described embodiment.

Furthermore, in the above-described embodiment, the connector housing 1 with the mask wall portion 112*a* formed with the exposure window 112*a*-4 through which the openings of the large-sized accommodation chambers 111*b* of the inner housing 111 are exposed is shown as an example of the connector housing. However, the connector housing is not limited thereto. The large-sized accommodation chambers and the exposure window for the openings thereof do not have to be provided, and only small-sized terminal accommodation chambers and through holes and guiding-recessed portions for the openings thereof may be provided. However, as described above, when not only the small-sized terminal accommodation chambers but also the structure corresponding to the large-sized accommodation chambers are provided, the connector that can transmit multiple types of electrical signals can be made in a preferable manner. In addition, as described above, when the exposure window 112*a*-4 is adopted as the structure of the mask wall portion 112*a* corresponding to the large-sized accommodation chambers 111*b*, the shape of the outer housing 112 can be simplified to reduce the labor required for processing.

Furthermore, in the above-described embodiment, the connector housing 1, in which the mask wall portion 112*a* of the outer housing 112 is formed with the inspection windows 112*a*-3 through which the locks of the lances 111*a*-1 are confirmed, is shown as an example of the connector housing. However, the connector housing is not limited thereto, and such inspection windows do not have to be provided. However, as described above, when the inspection windows 112*a*-3 for confirming the locks of the lances 111*a*-1 are provided, the connector C1 can be made with a high quality.

Furthermore, in the above-described embodiment, the connector housing 1, in which the inner housing 111 is provided with the single shaft projection 111*e* for axially supporting the lever 12 in the single plate shape, is shown as an example of the connector housing. However, the connector housing is not limited thereto. A C-shaped lever having two arm portions may be provided, and the inner housing may be provided with a pair of shaft projections for axially supporting the C-shaped lever. However, as described above, when the structure in which the lever 12 in the single plate shape is axially supported by the single shaft projection 111*e* is employed, the thickness of the connector housing 1 can be reduced.

Furthermore, in the above-described embodiment, the connector housing 1, in which the spacer 13 is provided to restrict movement of the terminals, and the inner housing 111 is provided with the shaft projection 111*e* such that the entry portion 111*h* for the spacer 13 and the lever 12 do not overlap with each other, is shown as an example of the connector housing. However, the connector housing is not limited thereto. The spacer does not have to be provided, and even if the spacer is provided, the shaft projection may be provided such that the lever overlaps with the entry portion. However, as described above, when the shaft projection 111*e* is provided such that the entry portion 111*h* of the spacer 13 and the lever 12 do not overlap with each other, the lever 12 in the single plate shape can be attached to the inner housing 111 in a preferable manner.

Furthermore, in the above-described embodiment, the connector housing 1, in which the interference wall 122*a*-3 that interferes with the lateral branch portion 111*e*-2 of the shaft projection 111*e* is provided in the inside of the fan hole portion 122*a*-2 of the shaft-receiving hole 122*a*, is shown as an example of the connector housing. However, the connector housing is not limited thereto, and the structure for axial support is not particularly limited. However, as described above, according to the above-described axial structure for causing the lateral branch portion 111*e*-2 of the shaft projection 111*e* to interfere with the interference wall 122*a*-3 of the shaft-receiving hole 122*a*, the lever 12 can be attached in a preferable manner, and detachment of the lever 12 can be prevented in a preferable manner.

Furthermore, in the above-described embodiment, the connector housing 1 provided with the first lever lock portion 122*c* for holding the lever 12 at the temporary lock position P11 and the second lever lock portion 122*d* for holding the lever 12 at the final lock position P12 is shown as an example of the connector housing. However, the connector housing is not limited thereto, and it is not necessary to provide the structure for holding the lever at the temporary lock position and at the final lock position. However, as described above, when the first lever lock portion 122*c* and the second lever lock portion 122*d* are provided, the position of the lever 12 can be stabilized at the temporary lock position P11 and the final lock position P12.

LIST OF REFERENCE SIGNS

1 connector housing
11 housing body
12 lever
12*a* rotation axis
13 spacer
111 inner housing
111*a* terminal accommodation chamber
111*a*-1 lance
111*b* large-sized accommodation chamber
111*c* outer peripheral surface
111*c*-1 surface portion
111*d* axis
111*e* shaft projection
111*e*-1 cylindrical portion
111*e*-2 lateral branch portion
111*f* lock claw
111g contact surface
111*h* entry portion
112 outer housing
112*a* mask wall portion
112*a*-1 through hole
112*a*-2 guiding-recessed portion
112*a*-3 inspection window
112*a*-4 exposure window
112*b* outer tubular portion
112*b*-1 opposite surface portion
112*b*-2 lock hole
112*b*-3 lock-receiving groove
112*b*-4 window portion
121 operation portion
122 arm portion
122*a* shaft-receiving hole
122*a*-1 circular hole portion
122*a*-2 fan hole portion
122*a*-3 interference wall
122*b* cam groove
122*c* first lever lock portion
122*d* second lever lock portion
131 tightening regulation portion
C1 connector
D11 rotation direction
D12 connector lock direction
D13 axial direction
P11 temporary lock position
P12 final lock position
W1 wire harness
W11 terminal-attached electric wire
W111 connector terminal
W112 electric wire
W12 large-sized terminal-attached electric wire
W121 large-sized terminal
W122 large electric wire

What is claimed is:

1. A connector housing comprising:
a housing body configured to accommodate a connector terminal; and
a lever axially supported on the housing body so as to be rotatable around a rotation axis, the lever being configured to rotate around the rotation axis from a temporary lock position to a final lock position to finally lock a mating connector to the housing body by pulling the mating connector having been temporarily locked,
wherein the lever includes:
an operation portion with which a rotation operation is performed; and
an arm portion extending from the operation portion to cross the rotation axis and having a shaft-receiving hole formed at a position that crosses the rotation axis,
wherein the housing body includes:
an inner housing formed in a tubular shape that includes a terminal accommodation chamber configured to accommodate the connector terminal, a shaft projection configured to be fitted into the shaft-receiving hole of the arm portion projecting from an outer peripheral surface of the inner housing to cross an axis of the tubular shape and form the rotation axis, and
an outer housing attached to the inner housing such that the arm portion having the shaft projection being fitted into the shaft-receiving hole is sandwiched between the outer housing and at least a surface portion of the outer peripheral surface from which the shaft projection projects so that the arm portion is rotatable around the rotation axis.

2. A connector comprising:
a connector terminal; and
the connector housing according to claim 1 configured to accommodate the connector terminal.

3. A wire harness comprising:

a terminal-attached electric wire having a connector terminal connected to an end portion of an electric wire; and the connector housing according to claim 1 configured to accommodate the connector terminal of the terminal-attached electric wire.

4. The connector housing according to claim 1, wherein the lever is formed in a single plate shape constituted by the operation portion and the arm portion, and only one shaft projection is provided on the inner housing.

5. The connector housing according to claim 4, further comprising a spacer that enters an inside of the inner housing of the housing body by crossing the terminal accommodation chamber, the spacer being capable of moving between a first position and a second position, the first position being a position where movement of the connector terminal in the terminal accommodation chamber is allowed, and the second position being a position where the spacer is pressed into the inside of the inner housing from the first position and where movement of the connector terminal in the terminal accommodation chamber is restricted, wherein the surface portion is a portion of the outer peripheral surface of the inner housing that is away from an entry portion where the spacer enters the inner housing, and the shaft projection is provided to project from the surface portion.

6. The connector housing according to claim 1, wherein the terminal accommodation chamber is provided in the inner housing such that an entry side of the terminal accommodation chamber for a mating terminal of the mating connector is open, and the outer housing includes a mask wall portion that covers a contact surface of the inner housing for contact with the mating connector, the contact surface being formed with an opening of the terminal accommodation chamber, the mask wall portion being provided with a through hole for the mating terminal and a guiding-recessed portion for guiding the mating terminal to the through hole, the through hole being formed at a position corresponding to the opening of the terminal accommodation chamber, the guiding-recessed portion being formed around the through hole.

7. The connector housing according to claim 6, wherein the outer housing includes the mask wall portion and an outer tubular portion extending from an outer peripheral edge of the mask wall portion so as to cover, from a side of the contact surface, at least a portion including the surface portion of the outer peripheral surface of the inner housing, and a lock claw is formed on either one of the outer peripheral surface of the inner housing or the outer tubular portion of the outer housing, and a lock hole with which the lock claw locks is formed on another one of the outer peripheral surface of the inner housing or the outer tubular portion of the outer housing.

8. The connector housing according to claim 6, wherein the housing body furthermore accommodates a large-sized terminal of which terminal size is larger than that of the connector terminal, the inner housing is provided with a large-sized accommodation chamber for accommodating the large-sized terminal in addition to the terminal accommodation chamber, the contact surface being formed with an opening of the large-sized accommodation chamber, and the mask wall portion is provided with an exposure window, through which the opening of the large-sized accommodation chamber is exposed.

9. The connector housing according to claim 6, wherein a lance for locking with the connector terminal accommodated in the terminal accommodation chamber is provided in the terminal accommodation chamber, and the mask wall portion is formed with an inspection window, next to the through hole, through which locking of the lance to the connector terminal is confirmed.

* * * * *